Patented Oct. 5, 1954

2,691,006

UNITED STATES PATENT OFFICE 2,691,006

COPOLYMERS OF TWO DIFFERENT LINEAR POLYESTERS

Paul J. Flory, Kent, Ohio, assignor, by mesne assignments, to The Goodyear Tire & Rubber Company, a corporation of Ohio No Drawing. Application September 21, 1948, Serial No. 50,431

16 Claims. (Cl. 260—45.4)

This invention relates to linear polyesters (including thioesters) and more particularly to polyester copolymers or interpolymers.

Linear polyesters are a well known class of materials and may be prepared by various methods. The best known method is by the condensation of a glycol and a dicarboxylic acid. Some of them may also be prepared by using acid chlorides instead of dicarboxylic acids. Other methods are also known.

Products of widely different characteristics may be obtained depending upon the choice of reactants and the degree to which the reaction is carried out. It has also been suggested to prepare modified polyesters by reacting more complex mixtures of starting materials. In order to prepare materials which are useful for the formation of fibers it is necessary to make high molecular weight polymers which are crystalline or may be induced to crystallize. Thus, it has generally been considered to be necessary to prepare simple, pure polyesters for this purpose. When a more complex mixture of reactants is used, for example by using a plurality of glycols and/or a plurality of acid chlorides, the melting point of the copolymer is generally considerably lowered and the tendency of the polyester to crystallize is much reduced. When such mixtures are used the structural units of the resultant polymer occur in a random arrangement in which the average number of structural units in the respective sequences may be represented by the formula $$\text{Average sequence length} = \frac{1}{1-X} \text{ units}$$

in which X represents the proportion of the particular repeating structural unit. Thus, if tetramethylene glycol be reacted with a mixture containing equimolecular proportions of terephthaloyl chloride and isophthaloyl chloride, the average length of both the tetramethylene terephthalate sequences and the tetramethylene isophthalate sequences will be $$\frac{1}{1-.50} = 2 \text{ units}$$

each unit having the structural formula:

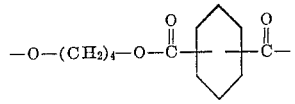

If, on the other hand, a very small amount of one component is used in proportion to the other component, the average sequence length of the lesser component approaches one unit. This may be demonstrated by considering the example in which 100 mols of tetramethylene glycol are reacted with 97 mols of terephthaloyl chloride and three mols of isophthaloyl chloride. In this case, the average length of the tetramethylene terephthalate sequences in the product will be $$\frac{1}{1-.97} = 33\tfrac{1}{3} \text{ units}$$

while the average length of the tetramethylene isophthalate sequences will be $$\frac{1}{1-.03} = 1.03 \text{ ester units}$$

In contrast to random copolyesters, the ordered copolyesters of the present invention contain a plurality of polyester sequences, at least two of which have an average sequence length of at least three units. Thus, such ordered copolyesters contain at least two different polyester sequences, both of which have an average sequence length greater than that which one of the sequences would have in the corresponding random copolymer.

These ordered copolyesters are prepared by a stepwise procedure, in which different polyester sequences are separately prepared and are joined to form a copolyester of higher molecular weight.

According to one method for preparing these ordered copolymers, a polyester having terminal hydroxyl groups is prepared, for example by reacting a glycol with a dicarboxylic acid or suitable derivative thereof such as an ester or acid chloride, using an excess of the glycol. Polyesters having terminal hydroxyl groups can also be prepared by reacting a monohydroxy monocarboxylic acid with a small amount of a glycol. A second polyester which, however, has terminal acid chloride groups is prepared by reacting a glycol with a dibasic acid chloride using an excess of the dibasic acid chloride. In preparing these polyesters, it is desirable to carry the reaction to substantial completion, in order to secure satisfactory control of the products and aid in duplicating results. In the second polymer either the glycol or the dibasic acid chloride or both the glycol and the dibasic acid chloride is different from those used in the first polymer. The two polymers are then interacted to form a polymer of higher molecular weight which is made up of sequences corresponding to the two initial polyesters. To produce high polymers, it is desirable to use substantially equivalent proportions of the two initial polyesters, i. e., to have the same number of hydroxyl and acid chloride end groups present in the mixture.

The ordered copolymers may also be made by preparing two different polyesters having terminal hydroxyl or carboxyl groups. Polyesters having terminal carboxyl groups can be prepared by reacting, preferably to substantial completion, a mixture of a glycol and a dicarboxylic acid, with the latter in excess. Polyesters having both hydroxyl and carboxyl end groups can be prepared by condensing equimolecular proportions of a glycol and a dicarboxylic acid or by self-condensation of a monohydroxy-monocarboxylic acid. The two polyesters are then coupled by reacting them with a bifunctional compound such as a diisocyanate, a diisothiocyanate, or other coupling agent with a sufficiently fast rate of reaction to minimize ester interchange.

One can also prepare two polyesters, each of which has terminal acid chloride groups and then couple the two polyesters by means of a glycol.

Also, two polyesters, each having terminal hydroxyl groups, can be coupled by condensation with a diacyl chloride.

In each of the above instances, a dimercaptan may be used in place of a glycol to produce corresponding sulfur-containing polymers.

If the pure polyester composed exclusively of a particular structural unit is crystalline, random copolymerization with a small amount of another structural unit lowers the melting point, the melting point varying as the proportion of the second unit is increased. Copolymers containing an equal number of the two units often melt 100° C. or more below the melting point of the higher melting of the parent polyesters. Often a very desirable combination of properties can be secured by random copolymerization but only with a reduction in the melting point, so that the temperature range over which the product may be used is reduced.

Ordered copolyesters from similar starting materials, on the other hand, exhibit melting points only a few degrees, generally not more than 10 to 20° C., lower than the higher melting of the parent polyesters. Furthermore, they are much stronger and tougher than random copolyesters of the same composition. They can be drawn into fibers of good strength and low elongation, whereas the random copolyesters are often of low strength and unsuitable for the production of fibers.

In general, the techniques and conditions for preparing ordered copolyesters follow known practices and are similar to those employed for polyesters generally. Thus, it is desirable to use pure reactants and to proportion them accurately in order to secure duplicable results and a high molecular weight in the final product. Substantially equivalent proportions of reactant end groups must be employed in the final coupling step in order to produce high polymers. To facilitate control of the process, it is desirable to carry to completion the first stage in which the initial polyesters are prepared, and the final stage in which the initial polymers are coupled must go well toward completion if high molecular weight is to be obtained. Oxygen, or air, should be excluded in all high temperature heating. This may be accomplished conveniently by sweeping out the reactor with an inert gas, such as nitrogen. Moisture should be carefully avoided when the condensation is effected through acid chloride groups, particularly in the coupling step, in order to avoid hydrolysis, with formation of the free acid and a resultant reduction in the rate of reaction.

The practice of the invention is illustrated by the following examples.

*Example 1*

A low molecular weight decamethylene isophthalate polyester with acid chloride end groups (polymer B) was prepared by reacting 4.357 grams of decamethylene glycol with 5.2526 grams of isophthaloyl chloride. The initial reaction was carried out at 110° C. and, after the initial vigorous reaction had ceased, the polymer was heated at 218° C. for one hour. At this stage the polymer had a viscosity of 45 poises. The calculated degree of polymerization of this polymer is 29, corresponding to the average molecular formula

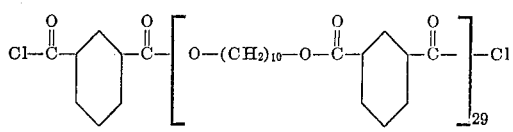

Decamethylene terephthalate with glycol end groups (polymer A) was prepared in a similar manner by reacting 27.188 grams of decamethylene glycol with 30.4545 grams of terephthaloyl chloride. After the vigorous stage of the reaction was largely completed at 110° C., the polymer was heated at 218° C. for one hour. The melt viscosity of this polymer was 54 poises at 218° C. and the calculated degree of polymerization was about 26, corresponding to an average molecular formula

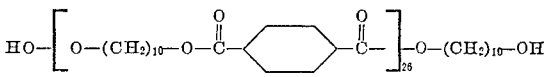

Four grams of this decamethylene terephthalate polymer (A) were added to the previously-described decamethylene isophthalate polymer (B) and the polymer mixture was heated at 218° C. for 50 minutes. The viscosity of the mixture rapidly increased with evolution of hydrogen chloride. The melt viscosity of the resulting copolymer was 890 poises at 218° C. The white, tough crystalline copolymer had a melting point of 125–128° C. This copolymer contained approximately 30 mol percent of decamethylene terephthalate and 70 mol percent of decamethylene isophthalate. The random copolymer of the same composition, prepared by co-reacting a mixture of decamethylene glycol with tere- and isophthaloyl chlorides in the molecular ratio of 30 to 70, is soft, rubbery and only slightly crystalline. All crystallinity disappears above 80° C. Pure decamethylene terephthalate melts at about 132° C. Pure decamethylene isophthalate does not crystallize on standing.

*Example 2*

A low molecular weight decamethylene isophthalate polyester with acid chloride end groups was prepared by reacting 4.357 grams of decamethylene glycol with 5.2526 grams of isophthaloyl chloride at 110° C. The temperature of the reaction was raised to 218° C. and maintained at this temperature for one hour at which time the melt viscosity was 40 poises at 218° C. The degree of polymerization calculated from the melt viscosity was approximately 28.

A decamethylene isophthalate polymer with hydroxyl end groups was prepared in a similar fashion by reacting 27.188 grams of decamethylene glycol with 30.759 grams of isophthaloyl chloride. At completion of the reaction the polymer had a viscosity of 46 poises at 218° C. This polymer was dissolved in tetrachloroethane to make a 16.1 percent by weight solution.

The degree of polymerization of this polymer as calculated from the reactants is about 39.

To the cooled polyester with acid chloride end groups were added 1.7 grams of polymer A of Example 1 (the decamethylene terephthalate polymer having terminal hydroxyl groups) as well as 46.9 grams of the above described solution of decamethylene isophthalate in tetrachloroethane. The mixture was stirred with dry nitrogen and refluxed for 30 minutes and then the tetrachloroethane was distilled out. After thorough evacuation at 218° C. under reduced pressure to remove all traces of solvent, the viscosity was so high that no measurements were made. The light colored copolymer slowly crystallized on standing and the melting point was 124–128° C. The product is pliable but very tough. The super cooled polymer is quite rubbery. The random copolymer of the same composition is noncrystalline. It is soft and rubbery.

This copolymer contained 10 mol percent decamethylene terephthalate and 90 mol percent of decamethylene isophthalate.

The fact that this copolyester crystallizes is especially noteworthy since it contains only 10 mol percent of a crystallizable material and 90 mol percent of a material that does not crystallize at all by itself on standing.

Example 3

A low molecular weight tetramethylene terephthalate polyester with acid chloride end groups was prepared by reacting 3.4467 grams of tetramethylene glycol with 8.481 grams of terephthaloyl chloride in 30 milliliters of dry o-dichlorobenzene. The solution was stirred with a stream of dry nitrogen and was heated for 45 minutes at 85–95° C. and for two and a half hours at reflux. The above amount of diacid chloride represents a 10 mol percent excess. The calculated degree of polymerization is approximately 10.

In a similar fashion, tetramethylene isophthalate with hydroxyl end groups was prepared by reacting 3.8153 grams of tetramethylene glycol and 7.7105 grams of isophthaloyl chloride in 30 milliliters of dry o-dichlorobenzene. This amount of glycol is 11.5 mol percent in excess of the equivalent amount. This polymer has a degree of polymerization of about nine units, calculated from the reactants.

The two solutions, when cooled, were thoroughly mixed by a stream of dry nitrogen and were heated at reflux for one hour. The solvent was distilled out and the last traces of solvent removed by heating at 241° C. under reduced pressure. The viscosity of the ordered copolymer was 3890 poises at 241° C. This copolymer was a light colored, crystalline solid with a melting point of 213–215° C. The corresponding random copolymer melts at about 140° C.

The estimated degree of polymerization of this ordered copolymer was about 50 and each molecule therefore contained, on the average, about 2.5 each of the tetramethylene terephthalate and tetramethylene isophthalate sequences. This copolymer can be cold drawn to produce fibers.

The random copolymer of the same composition is entirely unsuitable for fibers. It displays only limited crystallinity, being relatively soft and incapable of development of high strength on orientation by drafting.

Example 4

A tetramethylene terephthalate low molecular weight polymer (polymer A) with acid chloride end groups was prepared by reacting 4.5032 grams of tetramethylene glycol with 10.8621 grams of terephthaloyl chloride in 3.5 milliliters of dry tetrachloroethane. The mixture was heated at 85–95° C. for two hours and was stirred with a slow stream of dry, oxygen-free nitrogen. At the end of this period the temperature was raised until the solvent refluxed vigorously and was maintained for three hours at this temperature. The solvent was distilled off and the low molecular weight polymer was heated at 241° C. for 30 minutes. After cooling, 35 milliliters of dry o-dichlorobenzene were added. The calculated degree of polymerization of this low polymer was approximately 15.

Pentamethylene dithioterephthalate (polymer B) having terminal mercapto groups was prepared in a similar manner by reacting 7.382 grams of pentamethylene dimercaptan with 10.1515 grams of terephthaloyl chloride in 35 milliliters of dry o-dichlorobenzene. The reaction mixture was heated under an inert atmosphere for one and a half hours at 85–95° C. and then for three hours at reflux. The solvent was removed and the low molecular weight polymer was heated for 30 minutes at 255° C. After cooling 35 milliliters of solvent were added. The polymer had a degree of polymerization of about 12 as calculated from the 8.5 percent molar excess of dimercaptan used in this polymerization.

The solution of polymer B was added to the solution of polymer A and the two solutions were thoroughly mixed by a slow stream of dry nitrogen. The solvent was distilled off and the polymer was heated for one hour at 255° C. The last traces of solvent were removed in vacuo at 255° C. and the minimal estimate of the melt viscosity was 10,000 poises. This ordered copolyester was a light tan, hard, crystalline solid with a melting point of 230.5–231.5° C. The estimated degree of polymerization of the copolymer was about 100 and the polymer chain thus contained, on an average, about four sequences each of polymer A and polymer B.

Example 5

A low molecular weight decamethylene isophthalate (polymer A) with hydroxyl end groups was prepared by reacting 3.062 grams of decamethylene glycol with 3.350 grams of isophthaloyl chloride dissolved in 30 milliliters of dry tetrachloroethane, the glycol being used being 6.5 mol percent in excess of the equivalent amount. The initial phase of the reaction was carried out at 60° C. for one hour and the reaction was completed by refluxing for four hours.

A similar low molecular weight decamethylene terephthalate (polymer B) with hydroxyl end groups was prepared by reacting 27.841 grams of decamethylene glycol with 30.4545 grams of terephthaloyl chloride dissolved in 90 milliliters of dry tetrachloroethane. Again the glycol represented a 6.5 mol percent excess. The reaction was carried out at 110° C. for one and a half hours and was completed by refluxing for two hours. The solvent was distilled off at 218° C. and, after thorough evacuation at this temperature to remove all traces of solvent, the polymer had a melt viscosity of 10 poises. The melting point of the polymer was 130.5–132.5° C.

To the solution of decamethylene isophthalate (polymer A) was added 5.022 grams of the decamethylene terephthalate (polymer B) and the solution was heated at reflux under nitrogen until thoroughly mixed. After carefully introducing 0.436 gram of terephthaloyl chloride, the solvent was removed by distillation and the polymer had a melt viscosity of 6600 poises at 218° C. On cooling the polymer crystallized to give a white opaque tough solid.

Various other reactants may be employed in place of those shown in the foregoing examples and numerous modifications of the processes described may be made in practicing the invention.

In preparing the initial polymers, various dicarboxylic acids, both aromatic and aliphatic, can be used. Representative examples are glutaric, adipic, sebacic, suberic, pimelic, azelaic, brassidic, brassylic, succinic, phenylenediacetic, phenylenedipropionic, dihydracylic, diglycolic, thiodiglycolic, terephthalic, isophthalic, 1,4-naphthylene dicarboxylic, 1,7-naphthylene dicarboxylic, 1,3-naphthylene dicarboxylic, diphenic acids, and others known to be useful in this field.

Diacyl chlorides corresponding to the foregoing dicarboxylic acids may be used in the preparation of the initial polyesters or as coupling agents in the final step. When used as coupling agents, they can be the same as or different from the acid radicals in the polyester sequences.

Representative glycols are ethylene, trimethylene, tetramethylene, decamethylene, and other polymethylene glycols, diethylene and triethylene glycols, 2,2'-dihydroxydiethyl sulfide, 3,3'-dihydroxydipropyl sulfide, 1,4-cyclohexane diol, bis($\beta$-hydroxy ethoxy) benzene, phenylene bis(thioethylene hydroxide), di-$\beta$-hydroxyethoxy benzene, and the like. When used as coupling agents, the glycols may be the same as or different from the glycol radicals in the polyester sequences.

Thioesters can be prepared by using, instead of a glycol, an analogous aliphatic or araliphatic dimercaptan such as tetramethylene, hexamethylene, decamethylene, 3-oxa-1,5 dimercaptopentane, 3,6-dioxa-1,8-dimercapto-octane, 4-oxa-1,7-dimercaptoheptane, 3-thia-1,5-dimercaptopentane and 4-thia-1,7-dimercaptoheptane. The conditions for preparing the polythioesters are generally similar to those employed in making polyesters, except that the dimercaptans do not react readily with carboxyl groups and should be condensed with acid chloride groups. The preparation of polythioesters is more fully described in application Serial No. 707,529, filed November 2, 1946.

Representative examples of diisocyanates which can be used as coupling agents are ethylene, trimethylene, tetramethylene, hexamethylene, decamethylene, cyclohexylene, p-phenylene and naphthylene diisocyanates, 4,4'-diphenylene methane diisocyanate and the like. Others are known to react similarly. The corresponding diisothiocyanates may also be used.

Representative monohydroxy monocarboxylic acids are 6-hydroxy caproic acid, 10-hydroxydecanoic acid, and the like.

The invention has been particularly described in connection with ordered copolymers containing only two different structural units and these constitute the preferred form of the invention. The components may be combined in a wide range of proportions. Even a very small amount of one component can give observable results. When the sequences have an average length of at least three units, it is preferred to have the two different polyester units present in a ratio between 3:97 and 97:3. When the sequences have an average length of at least five units, it is preferred to have the two different polyester units present in a ratio between 5:95 and 95:5. A preferred type of interpolymer is that which contains tetramethylene terephthalate or tetramethylene isophthalate sequences having an average sequence length of at least five units and in which the tetramethylene terephthalate or tetramethylene isophthalate units, respectively, are present in a ratio between 5:95 and 75:25. Modified materials may be prepared by introducing additional sequences. For example, a polyester having terminal acid chloride groups can be used to couple two polyesters having hydroxyl end groups, each of the three polyesters being composed of different structural units.

As previously stated, the general techniques and conditions employed in this invention follow the known practices in this field. Thus, while certain representative embodiments and details have been shown for the purpose of illustrating the invention, it will be apparent to those skilled in this art that various changes and modifications may be made therein without departing from the spirit or scope of the invention.

I claim:

1. A method of preparing linear interpolymers which comprises condensing, with the elimination of hydrogen chloride, two different polyesters, each of said polyesters being composed of a different repeating unit and having an average length of at least three repeating units, one of said polyesters having terminal hydroxyl groups and the other having terminal acid chloride groups.

2. A method of preparing linear interpolymers which consists of condensing, with the elimination of hydrogen chloride, a mixture comprising a polyester having terminal hydroxyl groups and a different polyester having terminal acid chloride groups, each of said polyesters being composed of a different repeating unit and having an average length of at least three repeating units.

3. A method of preparing linear interpolymers which comprises condensing, with the elimination of hydrogen chloride, a polyester having terminal hydroxyl groups and a different polyester having terminal acid chloride groups, each of said polyesters being composed of a different repeating unit and having an average length of at least three repeating units, the two polyesters being reacted in a ratio between 3:97 and 97:3.

4. A method of preparing linear interpolymers which comprises condensing, with the elimination of hydrogen chloride, a polyester having terminal hydroxyl groups and a different polyester having terminal acid chloride groups, each of said polyesters being composed of a different repeating unit and having an average length of at least five repeating units, the two polyesters being reacted in a ratio between 5:95 and 95:5.

5. A method of preparing linear interpolymers which consists of condensing, with the elimination of hydrogen chloride, a mixture comprising a polyester having terminal hydroxyl groups and a different polyester having terminal acid chloride groups, each of said polyesters having an average length of at least three repeating units, one of said polyesters being a polymethylene terephthalate and the other being a polymethylene isophthalate.

6. As a new composition of matter, a linear interpolymer comprising sequences of repeating units of two different polyesters, each of which polyesters is composed of a different repeating unit, said sequences having an average length of at least three repeating units.

7. As a new composition of matter, a linear interpolymer comprising sequences of repeating units of two different polyesters, each of which polyesters is composed of a different repeating unit, said sequences having an average length of at least five repeating units.

8. As a new composition of matter, a linear interpolymer containing sequences of repeating units of two and only two different polyesters, each of which polyesters is composed of a different repeating unit, said sequences having an average length of at least three repeating units and in which the repeating units of the two polyesters are present in a ratio between 3:97 and 97:3.

9. As a new composition of matter, a linear interpolymer containing sequences of repeating units of two and only two different polyesters, each of which polyesters is composed of a different repeating unit, said sequences having an average length of at least five repeating units and in which the repeating units of the two polyesters are present in a ratio between 5:95 and 95:5.

10. As a new composition of matter, a linear interpolymer containing sequences of repeating units of two and only two different polyesters, each of which polyesters is composed of a different repeating unit, said sequences having an average length of at least five repeating units, one of said polyesters being polytetramethylene terephthalate, the tetramethylene terephthalate units being present in the interpolymer in a ratio between 5:95 and 75:25.

11. As a new composition of matter, a linear interpolymer containing sequences of repeating units of two and only two different polyesters, each of which polyesters is composed of a different repeating unit, said sequences having an average length of at least five repeating units, one of said polyesters being polytetramethylene isophthalate, the tetramethylene isophthalate units being present in the interpolymer in a ratio between 5:95 and 75:25.

12. As a new composition of matter, a linear interpolymer comprising sequences of repeating units of a polyester and a polythioester, said sequences having an average length of at least three units.

13. A method of preparing linear interpolymers which comprises providing two different linear polymers selected from the group consisting of polyesters and polythioesters, each of said polymers being composed of a different repeating unit, and coupling the ends of said initial polymers to form a linear polymer of higher molecular weight.

14. A method of preparing linear interpolymers which comprises providing two different linear polyesters, each of which is composed of a different repeating unit, and coupling the ends of said initial polyesters to form a linear polymer containing sequences of repeating units corresponding to said initial polyesters.

15. A method of preparing linear interpolymers which comprises providing two different linear polyesters having terminal hydroxyl groups, each of said polyesters being composed of a different repeating unit, and coupling the ends of said initial polyesters by condensing them, with the elimination of hydrogen chloride, with a diacyl chloride.

16. A method of preparing linear interpolymers which comprises providing two different linear polyesters having terminal acid chloride groups, each of said polyesters being composed of a different repeating unit, and coupling the ends of said initial polyesters by condensing them, with the elimination of hydrogen chloride, with a glycol.

References Cited in the file of this patent

UNITED STATES PATENTS

| Number | Name | Date |
|---|---|---|
| 2,333,639 | Christ et al. | Nov. 9, 1943 |
| 2,430,479 | Pratt et al. | Nov. 11, 1947 |
| 2,437,046 | Rothrock et al. | Mar. 2, 1948 |
| 2,449,613 | Miller et al. | Sept. 21, 1948 |
| 2,465,319 | Whinfield et al. | Mar. 22, 1949 |

FOREIGN PATENTS

| Number | Country | Date |
|---|---|---|
| 596,688 | Great Britain | Jan. 8, 1948 |

OTHER REFERENCES

Mark et al.: High Polymeric Reactions, vol. III, 1941, pp. 48 and 49.